(12) United States Patent
Appelberg

(10) Patent No.: US 8,739,542 B1
(45) Date of Patent: Jun. 3, 2014

(54) CLOSED VAPOR SYSTEM

(75) Inventor: Gustaf T. Appelberg, Fairfield, CT (US)

(73) Assignee: Appel Engineering Group, LLC, Fairfield, CT (US)

( * ) Notice: Subject to any disclaimer, the term of this patent is extended or adjusted under 35 U.S.C. 154(b) by 610 days.

(21) Appl. No.: 12/803,327

(22) Filed: Jun. 23, 2010

Related U.S. Application Data

(60) Provisional application No. 61/269,417, filed on Jun. 23, 2009.

(51) Int. Cl.
*F01K 25/02* (2006.01)
*F02C 1/04* (2006.01)
*F01K 23/06* (2006.01)

(52) U.S. Cl.
USPC ............................................ 60/682; 60/670

(58) Field of Classification Search
USPC ................... 60/643, 616, 618, 620, 645–681; 180/302, 310, 65.31; 903/904
See application file for complete search history.

(56) References Cited

U.S. PATENT DOCUMENTS

| | | | | |
|---|---|---|---|---|
| 3,619,558 A | * | 11/1971 | Block | 392/308 |
| 3,778,578 A | * | 12/1973 | Long et al. | 219/687 |
| 3,794,801 A | * | 2/1974 | Long et al. | 180/304 |
| 3,816,689 A | * | 6/1974 | Long | 219/687 |
| 3,920,945 A | * | 11/1975 | Smith et al. | 219/688 |
| 4,064,852 A | * | 12/1977 | Fulenwider, Jr. | 123/25 B |
| 4,094,377 A | * | 6/1978 | Biggs | 180/2.2 |
| 4,236,056 A | * | 11/1980 | Allen et al. | 219/688 |
| 4,326,598 A | * | 4/1982 | Acker | 180/304 |
| 4,697,424 A | * | 10/1987 | Dickerson et al. | 60/670 |
| 4,715,185 A | | 12/1987 | Salo | |
| 5,385,214 A | * | 1/1995 | Spurgeon | 180/304 |
| 5,723,844 A | * | 3/1998 | Dow et al. | 219/618 |
| 6,397,962 B1 | * | 6/2002 | Bllau | 180/65.23 |
| 6,809,304 B2 | | 10/2004 | Besmann et al. | |

(Continued)

FOREIGN PATENT DOCUMENTS

EP      1 652 715 A2      5/2006

OTHER PUBLICATIONS

"Steam: its Generation and Use," Sep. 2007, Babcock & Wilcox Co., p. 137.*

(Continued)

*Primary Examiner* — Christopher Jetton
(74) *Attorney, Agent, or Firm* — Ware, Fressola, Magurie & Barber LLP

(57) ABSTRACT

A closed vapor system includes a boiler arranged to store a vapor and a heating source configured to heat the vapor to a predetermined temperature. A source of pressure maintains the pressure of the vapor in a range of about 100 pounds per square inch to 150 pounds per square inch. Pressurized vapor is drawn from the boiler at a pressure in the range of about 100 pounds per square inch. A motor is responsive to the torque of the pressurized vapor drawn from the boiler and is configured to rotate a shaft. A compressor pump is responsive to rotation of the motor shaft and is arranged to receive effluent vapor from the motor to repressurize the effluent vapor and return it to the boiler. The closed vapor system may function as a battery, vehicle engine and a stationary power source.

6 Claims, 7 Drawing Sheets

(56) References Cited

U.S. PATENT DOCUMENTS

| | | | |
|---|---|---|---|
| 7,109,453 B1* | 9/2006 | Nadolski | 219/688 |
| 7,314,104 B2* | 1/2008 | Ketcham | 180/303 |
| 7,926,274 B2* | 4/2011 | Farkaly | 60/670 |
| 7,997,077 B2* | 8/2011 | Corley | 60/618 |
| 2005/0224493 A1 | 10/2005 | Varma | |

OTHER PUBLICATIONS

"The Advanced Rankine Cycle Engine and the Application Potential for Using the Cyclone Engine in the Automobile" by James D. Crank, May 28, 2010, pp. 1-10.

"A Fresh View of the Steam Car for Today" by James D. Crank, Mar. 2010, 21 pages.

* cited by examiner

CLOSED VAPOR SYSTEM

CROSS REFERENCE TO RELATED APPLICATIONS

Reference is made to and priority is claimed from U.S. Provisional Application Ser. No. 61/269,417 filed Jun. 23, 2009 the disclosure and contents of which are incorporated herein by reference.

FIELD OF THE INVENTION

The present invention relates generally to steam power systems, and deals more particularly with a closed vapor system for use as a power source for motors or engines.

BACKGROUND OF THE INVENTION

Steam has been considered for use as a power source for motors or engines because of the torque that may be developed, and there have been many attempts to use a steam engine as a viable alternative to the internal combustion engine as the power plant for vehicle propulsion or the driving source for electrical power generation. One of the most widely recognized steam propelled vehicles is the Stanley Steamer. Various short comings and disadvantages of the steam engines developed over the years such as the size of a boiler to produce steam, the heat source to create steam from the water, onboard water storage, water usage and replenishment due to leakage and evaporation, inability to mechanically couple the steam engine to a transmission to drive the wheels of the vehicle or rotate the shaft of an electrical generator are but a few of the reasons the steam engine has not become a viable alternative to internal combustion engines. The reader is referred to an article entitled "A Fresh View Of The Steam Car For Today" authored by James D. Crank and forming a part hereof as attachment A, which is incorporated herein by reference for additional commentary as to why the steam engine has not become a viable alternative to the internal combustion engine.

Another general drawback of steam or vapor systems is the inefficiency that results in the cycle due to heat losses as the vapor condenses such as for example in the Rankine steam cycle and is returned to the boiler as liquid to be reheated to vapor to complete the cycle. It has been proposed to increase the thermal efficiency of such systems by recirculating, repressurizing and reheating effluent steam for example as disclosed in U.S. Pat. No. 4,715,185 in which extraction steam is taken at various pressures and sequentially charged into closed path conveyor compartments to progressively increase the pressure of the steam within the compartments. The highest pressure stage displaces the steam from the compartments through a reheater and back to an injection station at the turbine. Although thermal efficiency is improved somewhat in that more heat is extracted in a cycle the steam torque is sequentially diminished. Accordingly, the proposed method and apparatus disclosed n U.S. Pat. No. 4,715,185 does not provide a satisfactory solution to overcome the limitations and shortcomings of known steam engines.

What is needed, therefore, is a system that provides the torque of steam and overcomes the shortcomings and disadvantages of known steam engines and systems.

SUMMARY OF THE INVENTION

In accordance with a first broad aspect of the invention a closed vapor system is presented comprising a boiler arranged to store a vapor and a heating source configured to heat the vapor to a predetermined temperature in a range of about 300° Fahrenheit to 358° Fahrenheit. A source of pressure maintains the pressure of the vapor in a range of about 100 pounds per square inch to 150 pounds per square inch. A first pressure reducing valve is connected to the boiler for drawing the pressurized vapor from the boiler at a pressure in the range of about 100 pounds per square inch. A motor is operatively connected to the first pressure reducing valve and is responsive to the torque of the pressurized vapor drawn from the boiler and is configured to rotate a shaft. A compressor pump is connected to and responsive to rotation of the motor shaft and is arranged to receive effluent vapor from the motor to repressurize the effluent vapor to a pressure in the range of about 160 pounds per square inch. A one-way pressure valve is located between an output of the compressor pump and an input of the boiler for recirculating the repressurized effluent vapor to the boiler. In one example of the invention, the vapor has a liquid volume of 10.4 cubic inch per 1728 cubic inch of vapor. In another example of the invention the boiler comprises an external shell, an internal metal shell and a thermal insulating material located between the external shell and the internal metal shell to maintain the vapor at a desired temperature and pressure between operating cycles of the closed vapor system. In one example of the invention a microwave source is connected to the boiler and configured to produce radio frequency (RF) energy to superheat the vapor to a desired temperature by direct molecular heating. In another example of the invention a susceptor system is arranged structurally isolated within the boiler to absorb the RF energy to produce heat to convert liquid condensate to vapor an to produce heat to melt frozen liquid condensate that may form in the boiler in colder environments between long periods of non-operation of the system.

BRIEF DESCRIPTION OF THE DRAWINGS

The foregoing and other features of the invention will become readily apparent from the following description when taken in conjunction with the drawings wherein.

DESCRIPTION OF THE INVENTION

Figure 1:
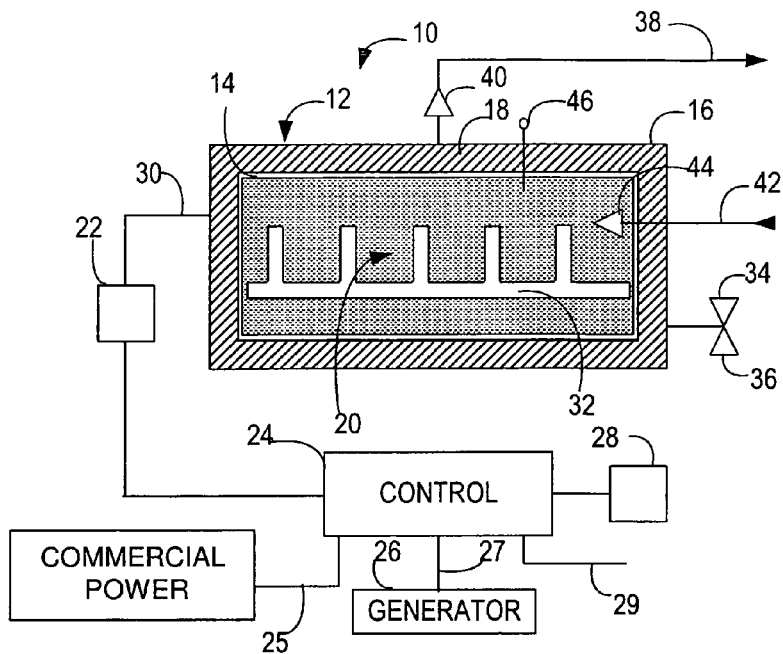
FIG. 1 is a schematic functional diagram of an inline vapor system embodying an example of the present invention.

Referring now to the drawings a schematic functional diagram of a closed vapor system embodying an example of the invention is shown in FIG. 1 in the form of an inline vapor system and is generally designated 10. The configuration of the inline vapor system 10 is particularly well suited to but by no means limited to mobile applications such as for example a mobile power supply or power source for vehicles. The inline vapor system 10 includes a boiler 12 which has an internal shell or metal liner 14 thermally insulated from the outer wall 16 of the boiler 12 by means of a suitable insulating material 18. The boiler 12 is insulated to maintain chosen temperatures and pressures for long time periods between the vapor system operating periods. Accordingly, the closed vapor system embodying the invention may be considered to be a battery because energy is stored for a period of time and is available when needed. A vapor generally designated 20 is stored in the boiler 12 and is maintained as further explained below in a temperature range of around 300° Fahrenheit (F) to 358° F. and in a pressure range of around 100 pounds per square inch (psi) to 150 psi. Entering 150 psi and 358° F. into a saturated water-pressure (steam) table shows the vapor has a liquid volume of 0.01811 cubic feet or 10.4 cubic inch/1728 cubic inch of vapor. It will be recognized that the invention requires a relatively small amount of liquid to produce a large volume of vapor which is convertible to power. It will be also recognized that the invention provides efficiencies in that there is no boiler water to contain, support of its weight and vaporization. Although water is used as the prescribed vapor in the examples of the invention, other suitable liquid/gases may be used. In some examples of the invention hydrochlorofluorcarbon 123, also known as HCFC 123 and SUVA 123, may be used and will produce greater vapor torque power because the vapor density of hydrochlorofluorcarbon 123 at 100° F. is 196 times greater than steam produced by water.

In some examples of the invention, a microwave source 22 is powered by a power supply 24 to produce radio frequency (RF) band energy. The RF energy is coupled from the microwave source 22 via a suitable conduit or conductor 30 to the boiler 12 and the RF energy from the microwave source 22 is radiated within the boiler to superheat the steam forming the vapor. The RF energy from the microwave source 22 provides direct molecular heating of the vapor. An example of superheating steam within a boiler is disclosed in US Patent Publication 2005/0224493.

The power supply 24 is powered electrically from other means such as a commercial power source or electrical grid via the electrical supply conductor generally designated 25. In another example of the invention the power supply 24 may be powered from a generator source or power generation means 26 via an electrical conductor 27. In another example of the invention as explained in further detail herein, the power supply 24 may be ac or dc power produced by a generator or alternator connected to the power supply 24 via the electrical conductor 29. A suitable battery 28 is used to power the control electronics of the power supply to cause the power supply to operate to carry out its intended functions. The control electronics may include a memory, a signal processor, voltage and current sensors and other electrical circuit components and elements as necessary to carry out one or more instructions carried on a computer readable storage medium and executable by one or more suitable processors.

In one example of the invention, a susceptor generally designated 32 is provided within the boiler 12 and is configured to absorb the RF energy and convert the RF energy to heat. The susceptor 32 is arranged within the boiler to be isolated structurally from the boiler and at the lowest liquid collection point within the boiler. In some instances for example, in periods of long non-use of the closed vapor system, the vapor may condense back into a liquid state and collect in the bottom portion of the boiler. The heat produced by the susceptor 32 as a result of converting the RF energy to heat speeds up the conversion of the condensate into vapor. In some instances for example, in a freezing environment the liquid condensate may freeze, for example into ice when water is used as the liquid for the vapor such that at startup of the closed vapor system 10 from a cold state, the susceptor 32 effectively converts the RF energy into heat to melt the ice to water. An example of a susceptor is disclosed in U.S. Pat. No. 6,809,304 the disclosure of which is incorporated herein by reference.

The heating process is accelerated by the stirring action of the vapor created through the reflection of RF energy off of the internal shell 14 of the boiler 12. A liquid/gas that is used to create the vapor is introduced into the boiler 12 through the liquid valve 34. Vacuum is drawn from the boiler and system via the vacuum valve 36. The vapor produced by the closed vapor system is output to a suitable conduit 38 through a pressure regulator valve 40. Effluent vapor is returned to the boiler 12 via a suitable conduit 42 through a one-way valve 44. A suitable temperature preset contact 46 is used to sense the temperature of the vapor to maintain the vapor temperature within the desired temperature range.

In another embodiment of the invention, a Calrod® heating element system is used rather than the susceptor system described above. The Calrod® heating element is arranged within the boiler to be isolated structurally from the boiler and at the lowest liquid collection point within the boiler. In some instances for example, in periods of long non-use of the closed vapor system, the vapor may condense back into a liquid state and collect in the bottom portion of the boiler. The Calrod® heating element is powered by the power supply 24 to produce heat. The heat produced by the Calrod® heating element speeds up the conversion of the condensate into vapor. In some instances for example, in a freezing environment the liquid condensate may freeze, for example into ice when water is used as the liquid for the vapor such that at startup of the closed vapor system 10 from a cold state, the Calrod® heating element effectively converts electrical power from the power supply into heat to melt the ice to water.

Figure 2:
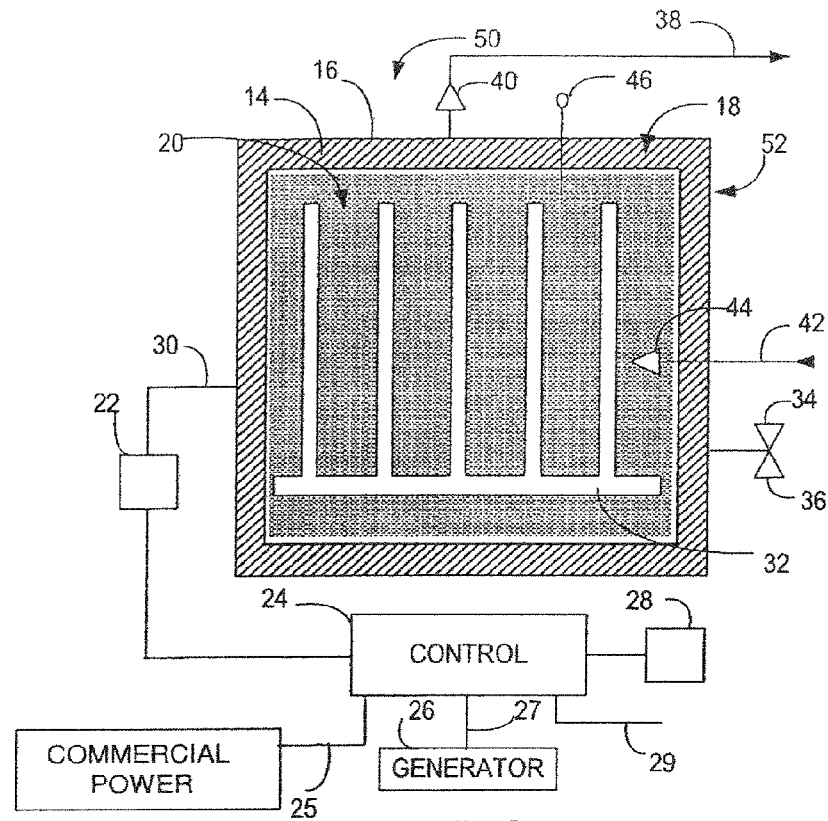
FIG. 2 is a schematic functional diagram of a stored energy vapor system embodying an example of the present invention.

In another example, the invention is configured as a stored energy vapor system shown as a schematic functional diagram in FIG. 2 and generally designated 50. The stored energy vapor system 50 is well suited due to its size to stationary power supply applications and is substantially identical to the inline vapor system 10 illustrated in FIG. 1 with the exception the boiler 52 and susceptor 54 are larger than the corresponding boiler 12 and susceptor 32 described in the inline vapor system 10. Accordingly, like parts and structural elements have like numbering.

Figure 3:
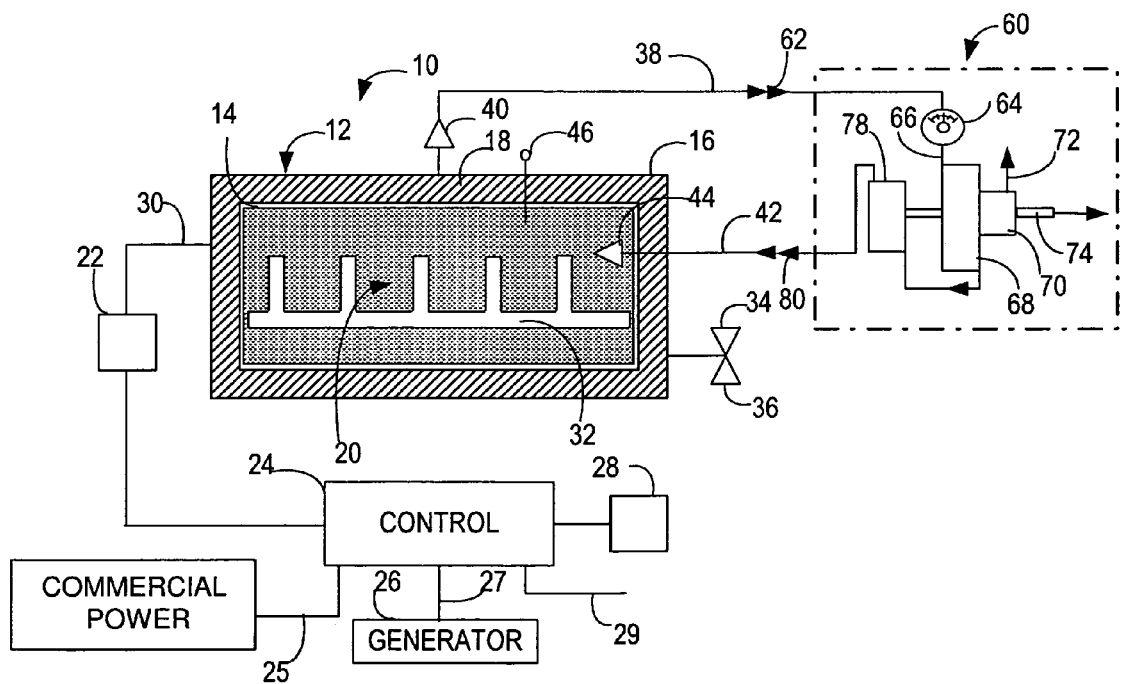
FIG. 3 is a schematic functional diagram of the inline vapor system of FIG. 1 used to drive a variable speed motor.
Figure 5:
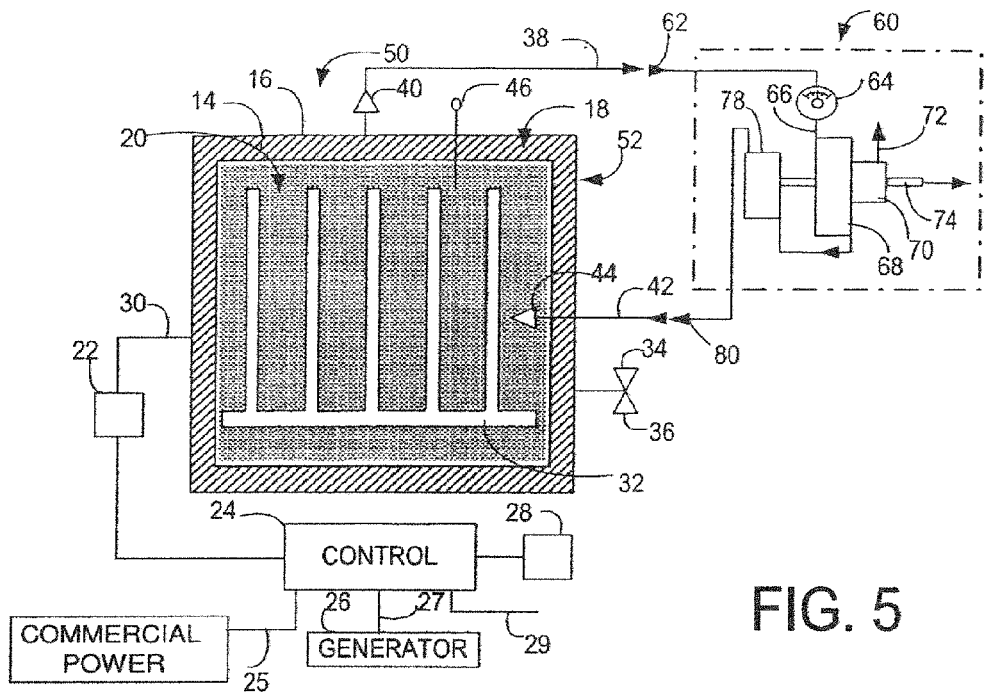
FIG. 5 is a schematic functional diagram of the stored energy vapor system of FIG. 2 used to drive a variable speed motor.

Turning now to FIGS. 3 and 5, the inline vapor system 10 and stored energy system 50 are described in an example for driving a variable speed motor generally designated 60. The variable speed motor 60 has a suitable vapor inlet conduit 62 that sealingly connects to the vapor output conduit 38 and to a suitable speed control device or regulator 64 the output 66 of which is suitably connected to a housing 68 inside of which is a rotor configured to be rotated by the vapor torque pressure entering the housing. The shaft of the rotor may in one example be coupled to an electrical generator or alternator 70 to produce an alternating current or direct current voltage potential on the lead 72 as measured to a suitable reference potential. The lead 72 may be connected to conduit 29 to provide an alternating current or direct current voltage to power the power supply 24 as discussed above. Alternately or in addition to the electrical generator or alternator 70, the rotor may be couple to an output drive shaft 74 to rotate the shaft to provide mechanical power as a driven shaft. Effluent vapor exits the housing 68 via the conduit 76 the output of which in turn is connected to a suitable pressure power pump 78. The output of the pressure power pump 78 is connected to a suitable conduit 80 which is sealingly connected to the input conduit 42 to return the effluent vapor to the boiler through the one-way valve 44. The pressure power pump 78 must produce a sufficient pressure to guarantee return of the vapor through the one-way valve. In one example of the invention, the effluent vapor exits the motor at approximately 270° Fahrenheit with a pressure of 5 pounds per square inch and the pressure power pump 78 produces at least 160 pounds per square inch.

Figure 4:
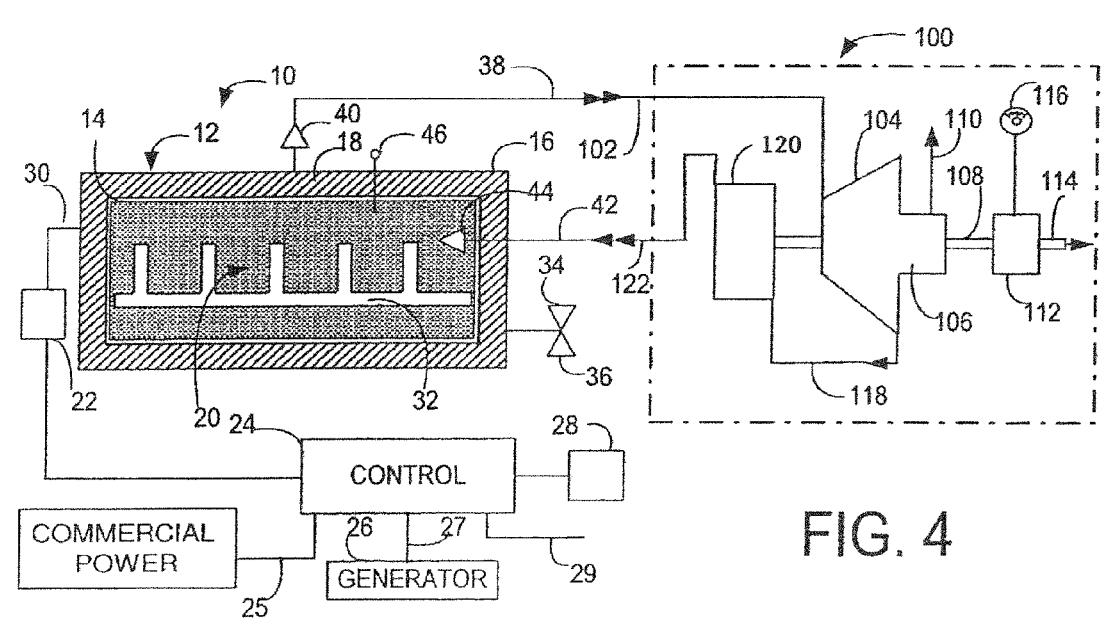
FIG. 4 is a schematic functional diagram of the inline vapor system of FIG. 1 used to drive a turbine motor.
Figure 6:
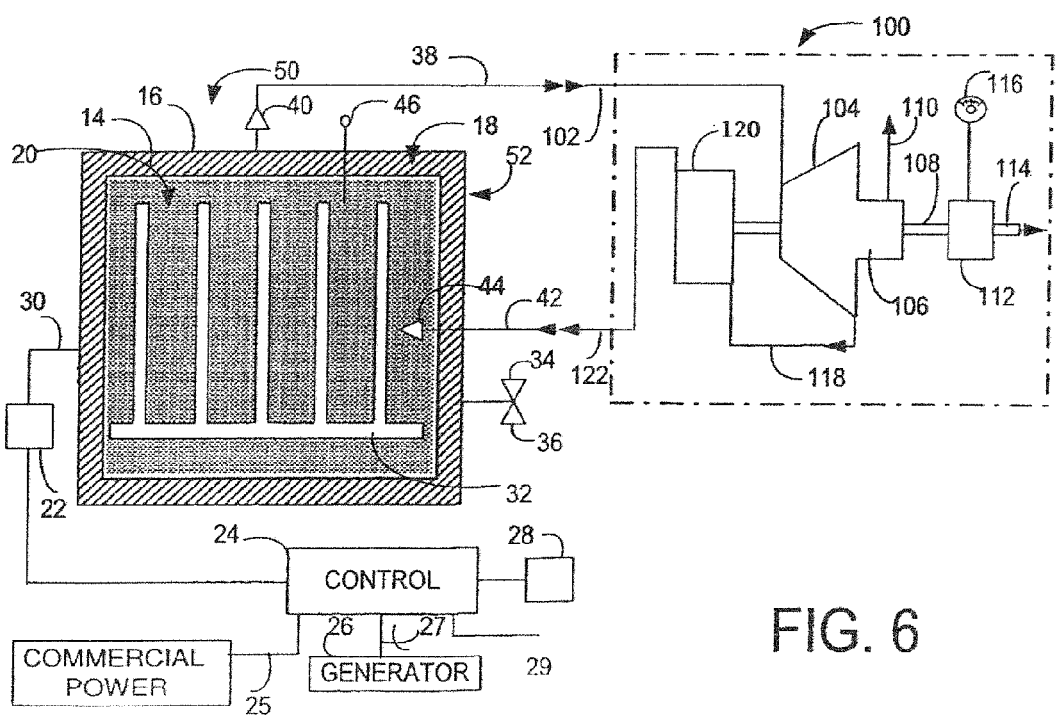
FIG. 6 is a schematic functional diagram of the stored energy vapor system of FIG. 2 used to drive a turbine.

Turning now to FIGS. 4 and 6, the inline vapor system 10 and stored energy system 50 are described in an example for driving a turbine motor generally designated 100. The turbine motor 100 has a suitable vapor inlet conduit 102 that sealingly connects to the vapor output conduit 38 and to a turbine housing 104 inside of which is a turbine blade driven rotor configured to be rotated by the vapor torque entering the housing 104. The blade driven rotor is connected to a shaft 108 and may be connected to an alternator or generator 106 to produce and alternating current or direct current voltage potential on the lead 110. The shaft 108 rotates at a constant high speed and is coupled to a speed reducer 112 to drive an output shaft 114 the rotation speed of which is regulated or adjusted to a desired rotation speed by means of a speed control device 116 to rotate the shaft 114 to provide mechanical power as a driven shaft. Effluent vapor exits the housing 104 via the conduit 118 the output of which in turn is connected to a suitable pressure power pump 120. The output of the pressure power pump 120 is connected to a suitable conduit 122 which is sealingly connected to the input conduit 42 to return the effluent vapor to the boiler through the one-way valve 44. The pressure power pump 120 must produce a sufficient pressure to guarantee return of the vapor through the one-way valve 44. In one example of the invention, the effluent vapor exits the motor at approximately 270° Fahrenheit with a pressure of 5 pounds per square inch and the pressure power pump 120 pressurizes the effluent vapor to at least 160 pounds per square inch.

Figure 7:
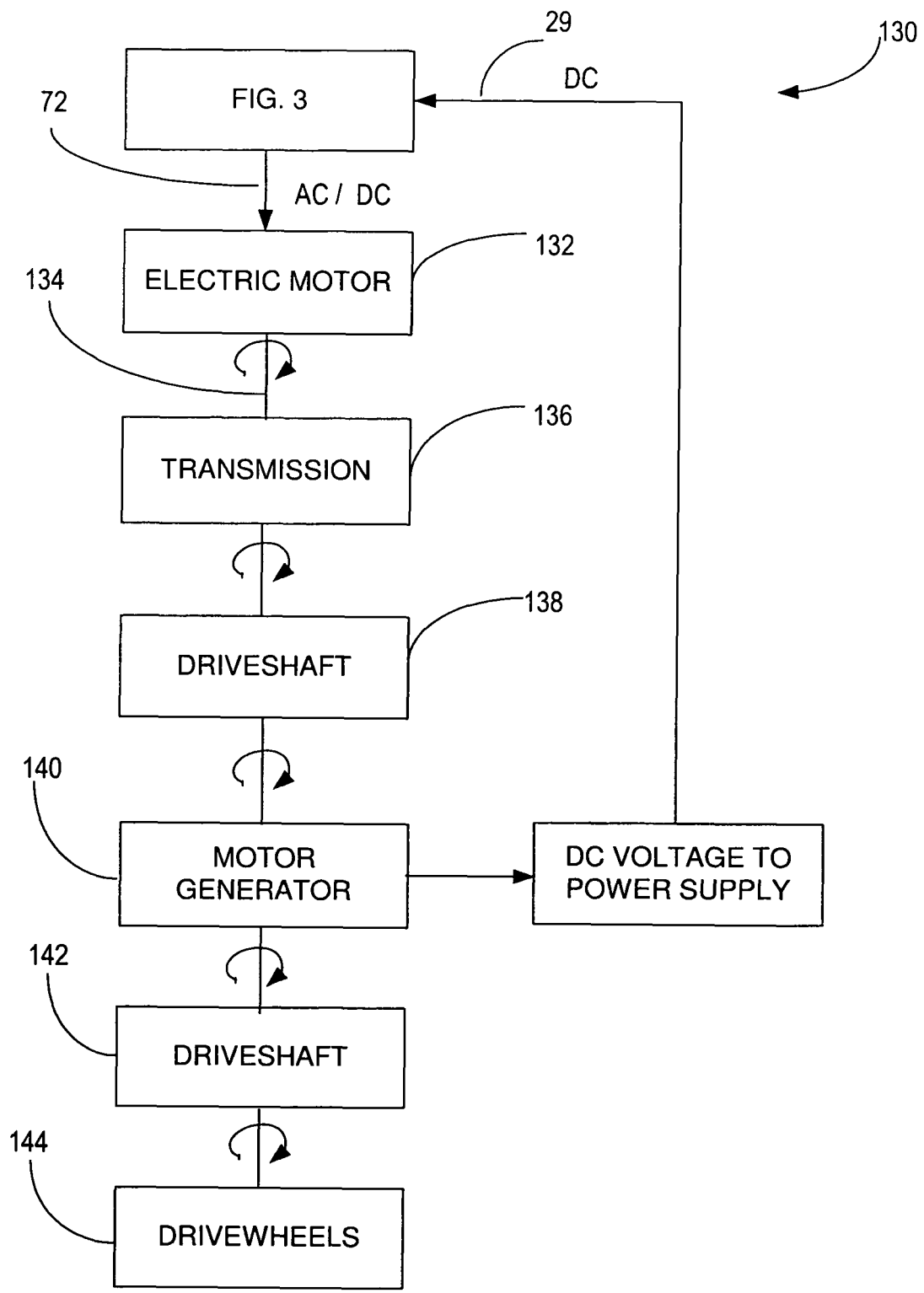
FIG. 7 is a schematic functional diagram of an example of a vehicle arranged to be electrically driven from the inline vapor system and variable speed motor as shown in FIG. 3.

Turning now to FIG. 7 a schematic functional diagram of an example of a vehicle arranged to be electrically driven from the inline vapor system and variable speed motor as shown in FIG. 3 is illustrated therein and generally designated 130. In one example of the invention, an alternating current or direct current voltage potential produced on the lead 72 in FIG. 3 is applied to an appropriately sized and configured electric motor 132. The electric motor 132 has an output drive shaft 134 connected to a suitable transmission 136. The transmission 136 engages with a driveshaft 138 which is operatively connected to a motor generator 140 which in turn drives a driveshaft 142 the drive end of which is configured to rotate the drive wheels 144 of the vehicle. The motor generator produces a direct current voltage potential when the vehicle is in rolling motion either as a result of the drive propulsion provided by the electric motor 132 or when the vehicle is coasting. The direct current voltage potential is applied to the lead 29 of the power supply 24 in FIG. 3.

Figure 8:
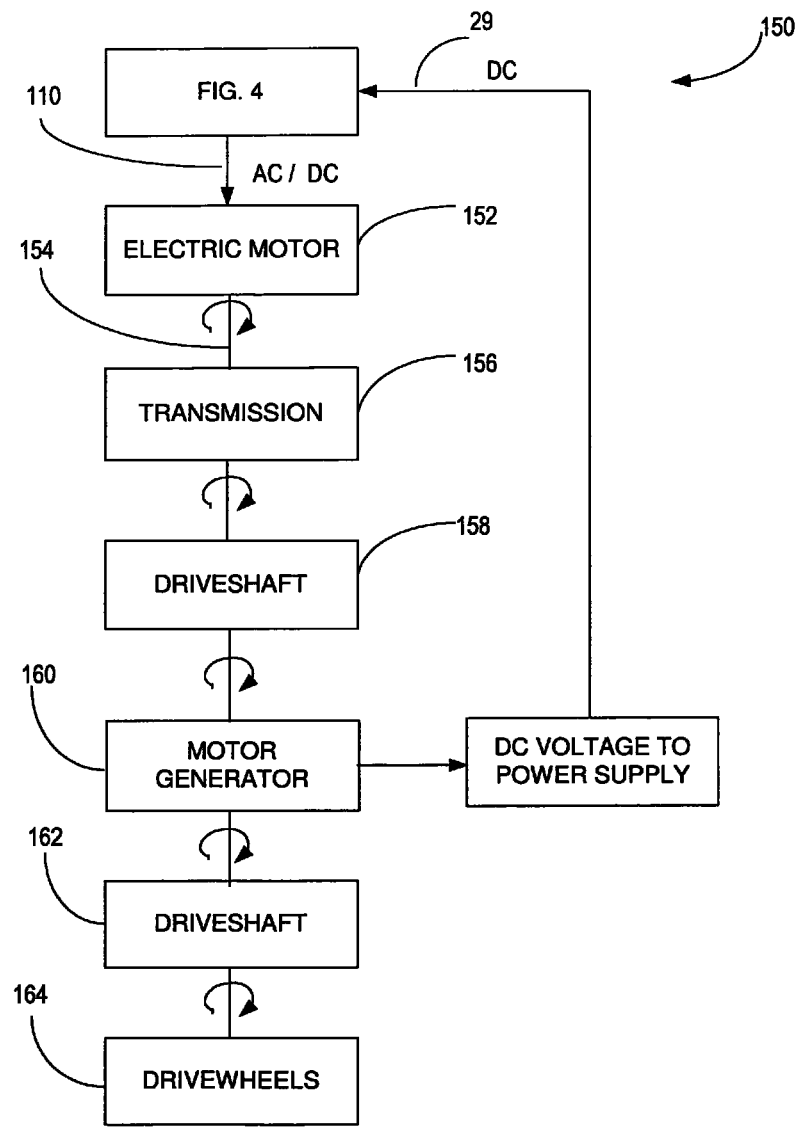
FIG. 8 is a schematic functional diagram of an example of a vehicle arranged to be electrically driven from the inline vapor system and turbine motor as shown in FIG. 4.

Turning now to FIG. 8 a schematic functional diagram of an example of a vehicle arranged to be electrically driven from the inline vapor system and turbine motor as shown in FIG. 4 is illustrated therein and generally designated 150. In one example of the invention, an alternating current or direct current voltage potential produced on the lead 110 in FIG. 4 is applied to an appropriately sized and configured electric motor 152. The electric motor 152 has an output drive shaft 154 connected to a suitable transmission 156. The transmission 156 operatively engages with a driveshaft 158 which is operatively connected to a motor generator 160 which in turn drives a driveshaft 162 the drive end of which is configured to rotate the drive wheels 164 of the vehicle. The motor generator produces a direct current voltage potential when the vehicle is in rolling motion either as a result of the drive propulsion provided by the electric motor 152 or when the vehicle is coasting. The direct current voltage potential is applied to the lead 29 of the power supply 24 in FIG. 4.

Figure 9:
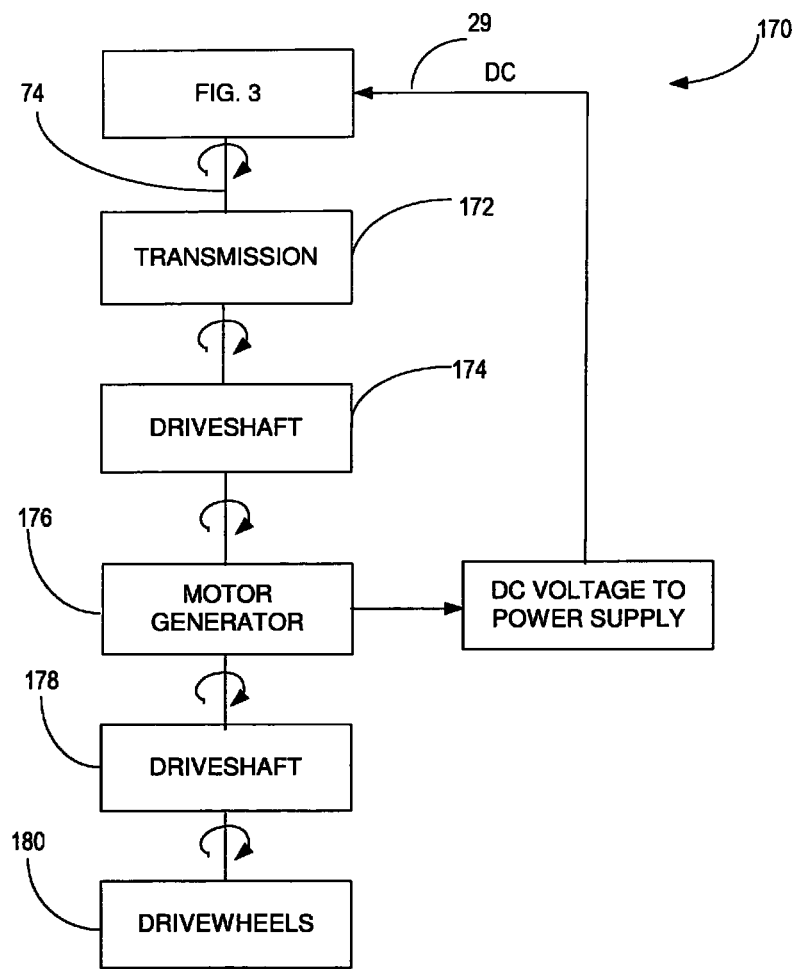
FIG. 9 is a schematic functional diagram of an example of a vehicle arranged to be mechanically driven from the inline vapor system and variable speed motor as sown in FIG. 8.

Turning now to FIG. 9 a schematic functional diagram of an example of a vehicle arranged to be mechanically driven from the inline vapor system and variable speed motor as shown in FIG. 3 is illustrated therein and generally designated 170. In one example of the invention, the driven shaft 74 in FIG. 3 is mechanically connected to the input of a suitable transmission 172. The transmission 172 operatively engages with a driveshaft 174 which in turn is operatively connected to a motor generator 176. The motor generator 176 is connected to a driveshaft 178 the drive end of which is configured to rotate the drive wheels 180 of the vehicle. The motor generator 176 produces a direct current voltage potential when the vehicle is in rolling motion either as a result of the drive propulsion provided by the driven shaft 74 or when the vehicle is coasting. The direct current voltage potential is applied to the lead 29 of the power supply in FIG. 3.

Figure 10:
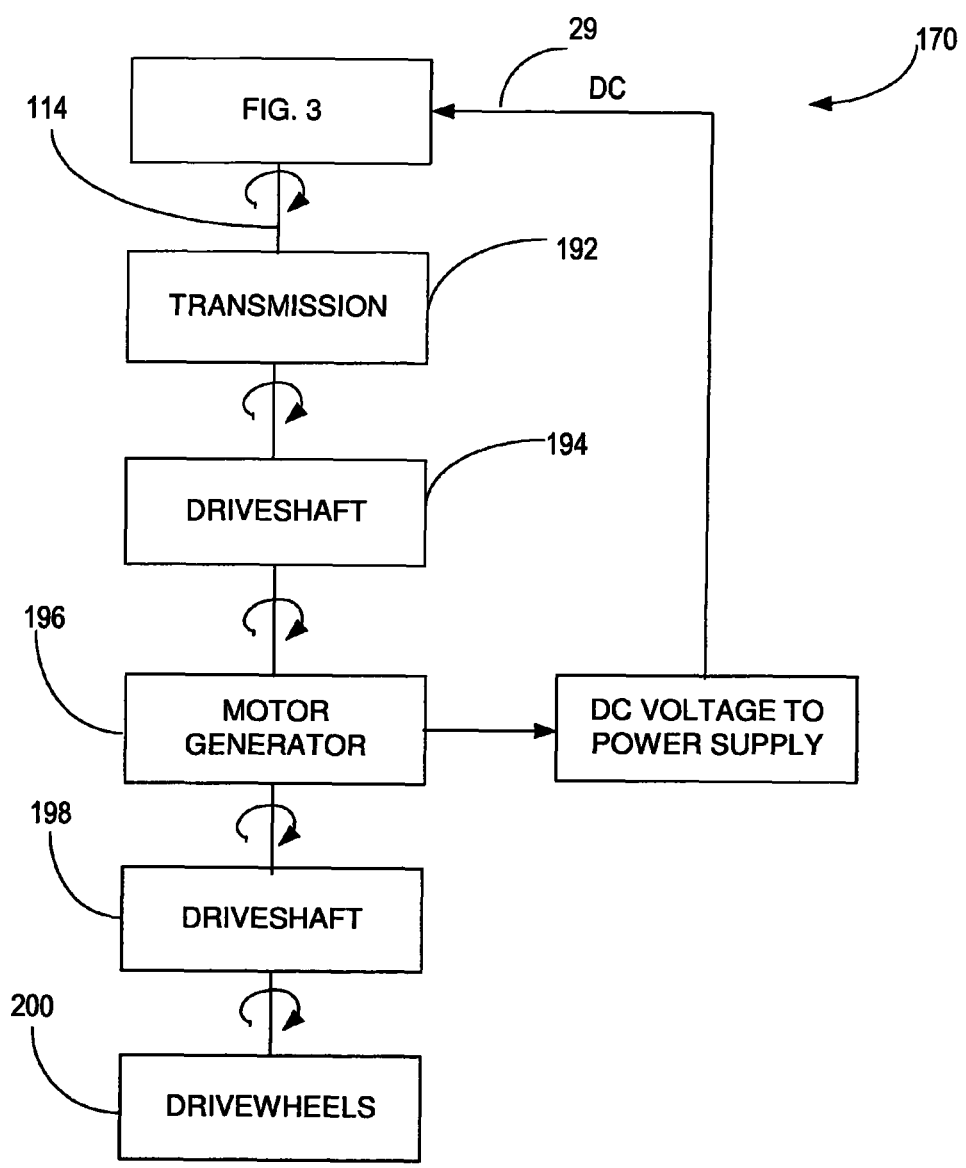
FIG. 10 is a schematic functional diagram of an example of a vehicle arranged to be mechanically driven from the inline vapor system and turbine motor as shown in FIG. 4.

Turning now to FIG. 10 a schematic functional diagram of an example of a vehicle arranged to be mechanically driven from the inline vapor system and turbine motor as shown in FIG. 4 is illustrated therein and generally designated 190. In one example of the invention, the driven shaft 114 in FIG. 4 is mechanically connected to the input of a suitable transmission 192. The transmission 192 operatively engages with a driveshaft 194 which in turn is operatively connected to a motor generator 196. The motor generator 196 is connected to a driveshaft 198 the drive end of which is configured to rotate the drive wheels 200 of the vehicle. The motor generator 196 produces a direct current voltage potential when the vehicle is in rolling motion either as a result of the drive propulsion provided by the driven shaft 114 or when the vehicle is coasting. The direct current voltage potential is applied to the lead 29 of the power supply in FIG. 4.

It is to be understood that the above-described arrangements are only illustrative of the application of the principles of the present invention and are not to be construed as limitations of the invention. Numerous modifications and alternative arrangements may be devised by those skilled in the art without departing from the scope of the invention and the appended claims are intended to cover such modifications and arrangements. Further, the invention contemplates all embodiments that may be inferred directly or indirectly from the disclosure and drawings whether or not expressly stated and claimed.

The invention claimed is:

1. A closed vapor system, comprising:
   a boiler, said boiler arranged to store a vapor;
   a heating source configured to heat said vapor to a predetermined temperature in a range of 300° Fahrenheit to 358° Fahrenheit;
   a compressor pump configured to maintain the pressure of said vapor in a range of 100 pounds per square inch to 150 pounds per square inch;
   a first pressure reducing valve connected to said boiler for drawing the pressurized vapor from said boiler at a pressure of 100 pounds per square inch;
   a motor, including a shaft, operatively connected to said first pressure reducing valve responsive to the torque of said pressurized vapor drawn from said boiler and configured to rotate said shaft, wherein said compressor pump is driven by said motor shaft and arranged to receive effluent vapor from said motor to repressurize said effluent vapor to a pressure of 160 pounds per square inch;

a one-way pressure valve located between an output of said compressor pump and an input of said boiler for recirculating said repressurized effluent vapor to said boiler.

2. The closed vapor system as defined in claim 1 wherein said boiler further comprises an external shell, an internal metal shell and a thermal insulating material between said external shell and said internal metal shell to maintain said vapor at a desired temperature and pressure between operating cycles of said closed vapor system.

3. The closed vapor system as defined in claim 1 further comprising a microwave source connected to said boiler and configured to produce radio frequency (RF) energy to heat said vapor to a desired temperature by direct molecular heating to provide saturated vapor.

4. The closed vapor system as defined in claim 3 further comprising a susceptor system arranged structurally isolated within said boiler to absorb said RF energy to produce heat to convert liquid condensate to vapor.

5. The closed vapor system as defined in claim 3 further comprising a susceptor system arranged structurally isolated within said boiler to absorb said RF energy to produce heat to melt frozen liquid condensate in said boiler.

6. The closed vapor system as defined in claim 1 further comprising a resistive heating element system arranged structurally isolated within said boiler to heat said vapor.

* * * * *